(12) United States Patent
Muthiah

(10) Patent No.: US 12,455,988 B2
(45) Date of Patent: Oct. 28, 2025

(54) DATA INTEGRITY IN KEY VALUE SOLID-STATE DRIVES

(71) Applicant: SANDISK TECHNOLOGIES, INC., Milpitas, CA (US)

(72) Inventor: Ramanathan Muthiah, Bangalore (IN)

(73) Assignee: SANDISK TECHNOLOGIES, INC., Milpitas, CA (US)

( * ) Notice: Subject to any disclaimer, the term of this patent is extended or adjusted under 35 U.S.C. 154(b) by 177 days.

(21) Appl. No.: 18/219,771

(22) Filed: Jul. 10, 2023

(65) Prior Publication Data

US 2025/0021702 A1    Jan. 16, 2025

(51) Int. Cl.
*G06F 21/78*    (2013.01)
*G06F 21/60*    (2013.01)

(52) U.S. Cl.
CPC ............ *G06F 21/78* (2013.01); *G06F 21/602* (2013.01)

(58) Field of Classification Search
CPC ......... G06F 21/78; G06F 21/602; G06F 21/64
See application file for complete search history.

(56) References Cited

U.S. PATENT DOCUMENTS

| | | | |
|---|---|---|---|
| 9,438,426 B2 | 9/2016 | Li | |
| 9,817,852 B2 | 11/2017 | Um | |
| 10,185,783 B2 | 1/2019 | Tanaka | |
| 10,678,768 B2 | 6/2020 | Li | |
| 11,392,571 B2 | 7/2022 | Jeon | |
| 2007/0192610 A1* | 8/2007 | Chun | G06F 21/575 |
| | | | 713/176 |
| 2019/0138612 A1* | 5/2019 | Jeon | G06F 16/221 |
| 2021/0200889 A1* | 7/2021 | Iwasaki | G06F 21/6227 |
| 2024/0405974 A1* | 12/2024 | Iijima | H04L 9/3271 |

* cited by examiner

*Primary Examiner* — Sangseok Park
(74) *Attorney, Agent, or Firm* — Arlene Neal; NEAL BLIBO LLC

(57) ABSTRACT

A key-value storage device may perform an integrity check on a key and/or a value in a key-value pair, prior to transmitting the value from a memory device to a requestor. When the storage device receives a write command to store the value in the memory device, a processor in the storage device may generate authentication data from the key and/or the value in the write command. The processor may store the authentication data and the value in the memory device. When the processor later receives a read command to retrieve the value from the memory device, the processor may perform the integrity check on the key and/or the value using the authentication data.

19 Claims, 5 Drawing Sheets

DATA INTEGRITY IN KEY VALUE SOLID-STATE DRIVES

BACKGROUND

A storage device, for example, a solid-state drive (SSD), may be a block-based storage device or a key-value storage device. The block-based storage device may store data in blocks of a fixed size on a communicatively coupled memory device and may address the data using logical block addresses that may be mapped one-to-one to physical addresses on the memory device. The one-to-one logical block address to physical address mappings may be stored in a logical-to-physical (L2P) table. When a host transmits data to be written to the memory device, the host may associate one or more logical block addresses with the data, wherein each logical block address may be associated with a sector of, for example, 512 bytes.

The block-based storage device may perform fragmenting on host write data by breaking up or accumulating the host write data into uniform-sized fragments before sending the data to the memory device. For example, depending on the configuration of the storage device, the data may be divided into fragments (Flash Management Units (FMUs)) of, for example, 4 Kilobytes (KB). Fragmenting of the data may aid in mapping the logical addresses associated with the host data to physical addresses in the memory device.

The block-based storage device may perform data integrity management with logical block address tagging, wherein each FMU may be tagged with metadata including the associated logical block address when stored in the memory device. In performing data management functions such as garbage collection functions to optimize space and improve efficiency and in checking for mapping failures, the block-based storage device may perform logical block address checks by matching the L2P table with the metadata tagged to the FMUs. If there is a match between the L2P table and the metadata, the block-based storage device may determine that the data is properly stored.

The key-value storage device may store variable-length data as a single value in contiguous bytes on the memory device. The key-value storage device may address the value with a unique key associated with the value, wherein the value may be stored and retrieved from the memory device as one addressable object. The key-value storage device may directly map the key to a physical location on the memory device, without associating logical block addresses with the key and/or value. A mechanism is needed in the key-value storage device to perform data integrity management on the key and/or value stored in the memory device.

SUMMARY

In some implementations, a key-value storage device may perform an integrity check on at least one of a key and a value in a key-value pair, prior to transmitting the value to a requestor. The storage device may include a memory device to store the value. The storage device may also include a processor that may receive a write command to write the value to the memory device, generate authentication data from at least one of the key and the value in the write command, and store the authentication data and the value in the memory device. The processor may further receive a read command to retrieve the value from the memory device and perform the integrity check on at least one of the key and the value using the authentication data.

A method is provided for generating authentication data to be used in performing an integrity check on at least one of a key and a value in a key-value pair, prior to storing the value in a memory device communicatively coupled to the key-value storage device. The method includes receiving a write command to write the value to the memory device. The method also includes generating authentication data from the key and/or the value in the write command, the authentication data being used to perform an integrity check during retrieval of the value from the memory device. The method also includes storing the authentication data and the value in the memory device.

A method is provided to perform an integrity check in the key-value storage device on a key and/or value in a key-value pair, prior to transmitting the value to a requestor. The method includes receiving, by a processor in the key-value storage device, a read command to retrieve the value from the memory device communicatively coupled to the key-value storage device. The method also includes retrieving authentication data generated by the key-value storage device prior to storing the value on the memory device. The method further includes performing the integrity check on the key and/or value using the authentication data.

Figure 1:
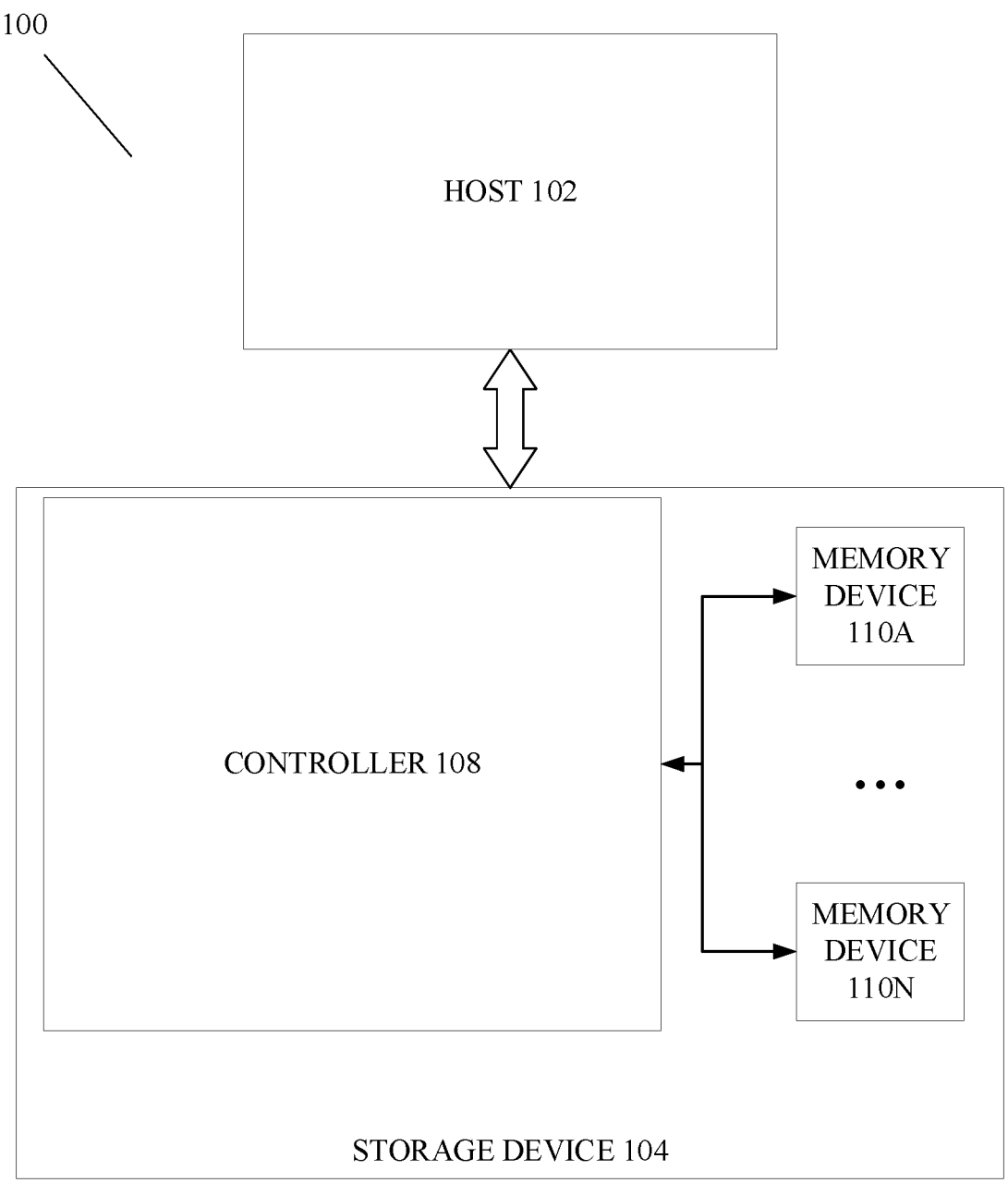
FIG. 1 is a schematic block diagram of an example system in accordance with some implementations.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of implementations of the present disclosure.

The apparatus and method components have been represented where appropriate by conventional symbols in the drawings, showing those specific details that are pertinent to understanding the implementations of the present disclosure so as not to obscure the disclosure with details that will be readily apparent to those of ordinary skill in the art.

DETAILED DESCRIPTION OF THE INVENTION

The following detailed description of example implementations refers to the accompanying drawings. The same reference numbers in different drawings may identify the same or similar elements.

FIG. 1 is a schematic block diagram of an example system in accordance with some implementations. System 100 includes a host 102 and a storage device 104. Host 102 may transmit commands to read data from or write data to storage device 104. Host 102 and storage device 104 may be in the same physical location as components on a single computing device or on different computing devices that are communicatively coupled. Storage device 104, in various embodiments, may be disposed in one or more different locations relative to the host 102. Host 102 may include additional components (not shown in this figure for the sake of simplicity).

Storage device 104 may be a key-value storage device including a controller 108. Storage device 104 may also include one or more memory devices 110a-110n (referred to herein as memory device(s) 110). Storage device 104 may be, for example, a solid-state drive (SSD), and the like.

Memory device 110 may be flash based, including, for example, NAND flash memory. Memory device 110 may be included in storage device 104 or may be otherwise communicatively coupled to storage device 104. Variable length data (also referred to herein as a value in a key-value pair) may be stored in memory device 110 and may be addressed by a unique variable length key. Storage space in memory device 110 may be allocated in increments of bytes, wherein a necessary amount of physical storage may be allocated to the variable length value. Storage device 104 may provide and/or maintain a mapping of the keys and values as stored on memory device 110. For example, storage device 104 may maintain a mapping of the keys and values in a key-to-value table.

Controller 108 may process foreground operations including instructions transmitted from host 102. For example, controller 108 may read data from and/or write data to memory device 110 based on instructions received from host 102. When host 102 transmits a command to storage device 104, storage device 104 may receive the command and determine if the command is, for example, a write command, a read command, or an administration command.

If the command received from host 102 is a write command, prior to storing the write command data to memory device 110, storage device 104 may generate authentication data from the write command data received from host 102. The authentication data may be a key-value header generated by storage device 104, wherein the key-value header may include the key assigned to the write command data and one or more hash values generated by storage device 104. For example, the key-value header may include the key assigned to the write command data, a hash of the key+value for a given length, and/or a hash of the value for a predefined length.

Storage device 104 may use dynamic hash lengths. In some cases, the hash length may be predetermined based on the length of the value to optimize the key-value header length. This may ensure that storage device 104 does not generate a relatively large key-value header for a relatively small value length.

When host 102 transmits the write command data, storage device 104 may break up or accumulate the host write data into uniform-sized fragments before sending the data to memory device 110. Exemplary fragments (Flash Management Units (FMUs)) sizes may be 4 KB, 8 KB, 16 KB, 32 KB, etc. In an example where storage device 104 breaks up or accumulates the host write data into 4 KB FMUs, when storage device 104 receives a write command with a key and a 512 KB value from host 102, storage device 104 may break up the 512 KB data into 128-4 KB FMUs. Storage device 104 may associate each of the 128-4 KB FMUs with the key. Storage device 104 may update the key-to-value table to show the mapping of the key with the 128 FMUs and store the 128-4 KB FMUs in memory device 110.

As a key-value storage device that allows for byte-wise storage, storage device 104 may also store the entire value as one component. In the example where, storage device 104 receives a key and a 512 KB value from host 102, storage device 104 may store the entire 512 KB value as one unit (without fragmenting the value) and the start address of the physical location in memory device 110 may be marked in the key-value table alongside the length.

In the example where storage device receives a key and a 512 KB value, prior to storing the data on memory device 110, storage device 104 may create the key-value header including the key and one or more generated hash values. For example, storage device 104 may create a key-value header including the key, a hash generated from the key+value for a given length, and/or a hash generated from the value for a predefined length. In cases where storage device 104 fragments the 512 KB data, storage device may associate each of the 128 FMUs with the key-value header and store the key-value header and the associated FMUs in the same block(s) in memory device 110. Storage device 104 may also associate the key with the key-value header. Storage device 104 may store the key-value header in a separate block on memory device 110 from the block(s) storing the associated FMUs and/or value.

If host 102 issues a read command to retrieve the value from memory device 110, during retrieval, storage device 104 may perform one or more integrity checks on the key and/or value. When retrieving the value, controller 108 may authenticate the key-to-value mappings. For example, controller 108 may retrieve the key from the key-to-value table to determine the physical location of the value in memory device 110. Controller 108 may also retrieve the key from the key-value header associated with the key/value being retrieved. Controller 108 may check the integrity of the key-to-value mappings by comparing the key obtained from the key-value header with the key in the read command. If the keys do not match, controller 108 may determine that there is an error and generate the necessary triggers.

If the keys match, controller 108 may perform further integrity checks by regenerating one or more hash values stored in the key-value header. For example, controller 108 may regenerate a hash of the data and/or a hash of the key+data as stored in memory device 110. Controller 108 may retrieve the hash stored in the key-value header and compare the regenerated hash with the hash stored in the key-value header. If the regenerated hash matches the hash stored in the key-value header, controller 108 may confirm the integrity of the data prior to sending the data to host 102. If the regenerated hash does not match the hash stored in the key-value header, controller 108 may determine that there is an error and generate the necessary triggers.

Controller 108 may also execute background operations to perform NAND block management functions such as failure recovery and read scrub and to otherwise manage resources on memory device 110. For example, controller 108 may monitor memory device 110 and execute garbage collection and other relocation functions per internal relocation algorithms to refresh and/or relocate the data on memory device 110. When performing relocation functions, storage device 104 may move data internally between different blocks on memory device 110. Prior to moving the data, controller 108 may retrieve the key for the data being moved from the key-to-value table and from the key-value header associated with the data and compare the keys to determine the mapping integrity on storage device 104. If the keys match, controller 108 may further confirm the integrity of the data, prior to moving the data internally on memory device 110. For example, controller 108 may regenerate one or more hash values in the key-value header and confirm that the regenerated hash matches the hash stored in key-value header.

Storage device 104 may perform these processes based on a processor, for example, controller 108 executing software instructions stored by a non-transitory computer-readable medium, such as storage component 110. As used herein, the term "computer-readable medium" refers to a non-transitory memory device. Software instructions may be read into storage component 110 from another computer-readable medium or from another device. When executed, software instructions stored in storage component 110 may cause controller 108 to perform one or more processes described herein. Additionally, or alternatively, hardware circuitry may be used in place of or in combination with software instructions to perform one or more processes described herein. Thus, implementations described herein are not limited to any specific combination of hardware circuitry and software. System 100 may include additional components (not shown in this figure for the sake of simplicity). FIG. 1 is provided as an example. Other examples may differ from what is described in FIG. 1.

Figure 2:
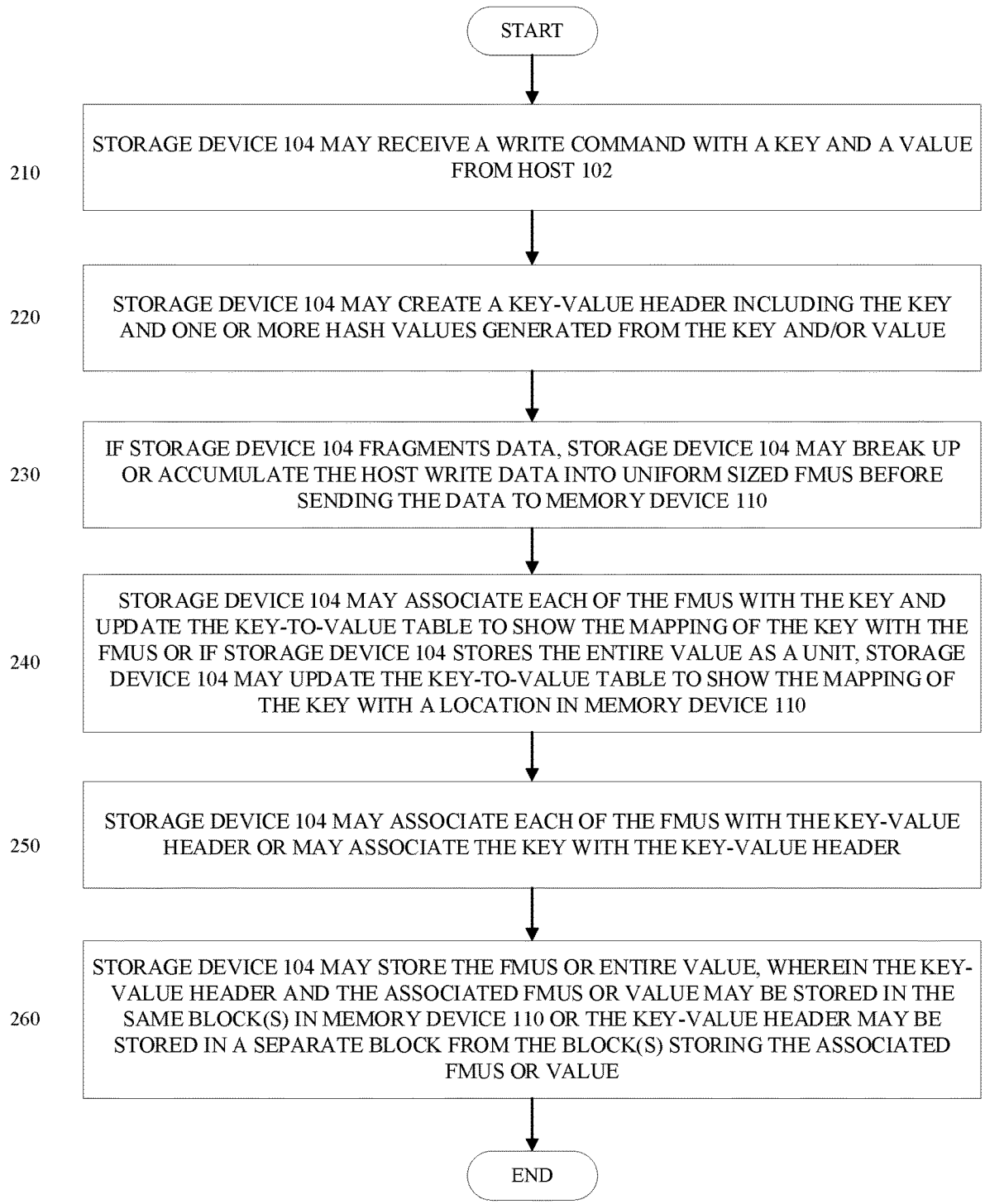
FIG. 2 is a flow diagram of an example process for establishing authentication data prior to storing a value in a key-value storage device in accordance with some implementations.

FIG. 2 is a flow diagram of an example process for establishing authentication data prior to storing a value in a key-value storage device in accordance with some implementations. At 210, storage device 104 may receive a write command with a key and a value from host 102. At 220, storage device 104 may create a key-value header including the key and one or more hash values generated from the key and/or value.

At 230, if storage device 104 fragments data, storage device 104 may break up or accumulate the host write data into uniform sized FMUs before sending the data to memory device 110. At 240, storage device 104 may associate each of the FMUs with the key and update the key-to-value table to show the mapping of the key with the FMUs or if storage device 104 stores the entire value as a unit, storage device 104 may update the key-to-value table to show the mapping of the key with a location in memory device 110.

At 250, storage device 104 may associate each of the FMUs with the key-value header or may associate the key with the key-value header. At 260, storage device 104 may store the FMUs or entire value, wherein the key-value header and the associated FMUs or value may be stored in the same block(s) in memory device 110 or the key-value header may be stored in a separate block from the block(s) storing the associated FMUs or value. As indicated above FIG. 2 is provided as an example. Other examples may differ from what is described in FIG. 2.

Figure 3:
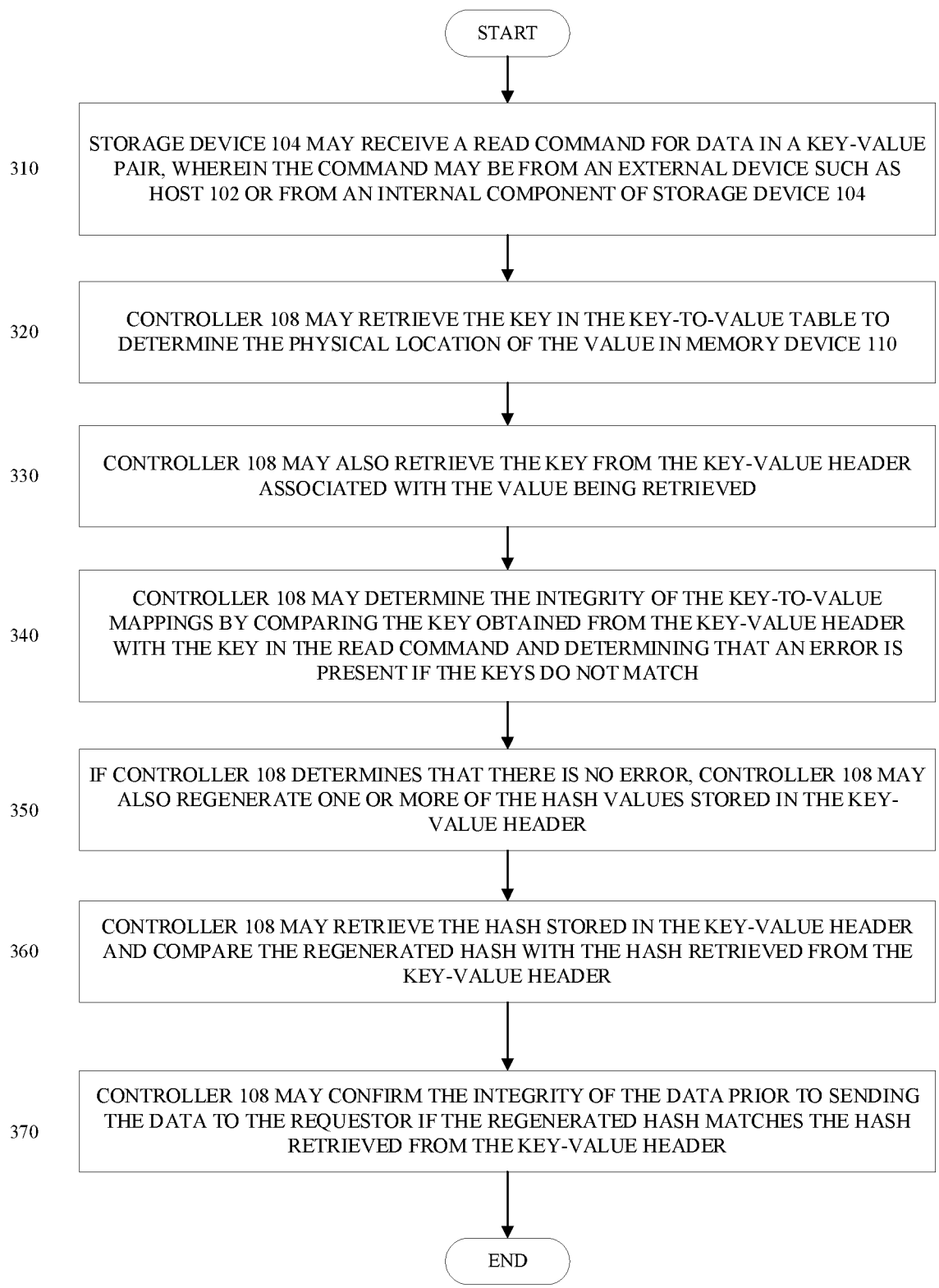
FIG. 3 is a flow diagram of an example process for performing an integrity check on a key and/or value in the key-value storage device prior to relocation of the value on a memory device or transmission of the value to an external requestor in accordance with some implementations.

FIG. 3 is a flow diagram of an example process for performing an integrity check on the key and/or value in the key-value storage device prior to internal relocation of the value on the memory device or transmission of the value to an external requestor in accordance with some implementations. At 310, storage device 104 may receive a read command for data in a key-value pair, wherein the command may be from an external device such as host 102 or from an internal component of storage device 104. At 320, controller 108 may retrieve the key in the key-to-value table to determine the physical location of the value in memory device 110. At 330, controller 108 may also retrieve the key from the key-value header associated with the value being retrieved. At 340, controller 108 may determine the integrity of the key-to-value mappings by comparing the key obtained from the key-value header with the key in the read command and determining that an error is present if the keys do not match. The error could be a mapping error or a data error due to failure on memory device 110 or firmware on storage device 104.

At 350, if controller 108 determines that there is no error, controller 108 may also regenerate one or more of the hash values stored in the key-value header. For example, controller 108 may regenerate a hash of the data and/or a hash of the key+data as stored in memory device 110. At 360, controller 108 may retrieve the hash stored in the key-value header and compare the regenerated hash with the hash retrieved from the key-value header. At 370, controller 108 may confirm the integrity of the data prior to sending the data to the requestor if the regenerated hash matches the hash retrieved from the key-value header. As indicated above FIG. 3 is provided as an example. Other examples may differ from what is described in FIG. 3.

Figure 4:
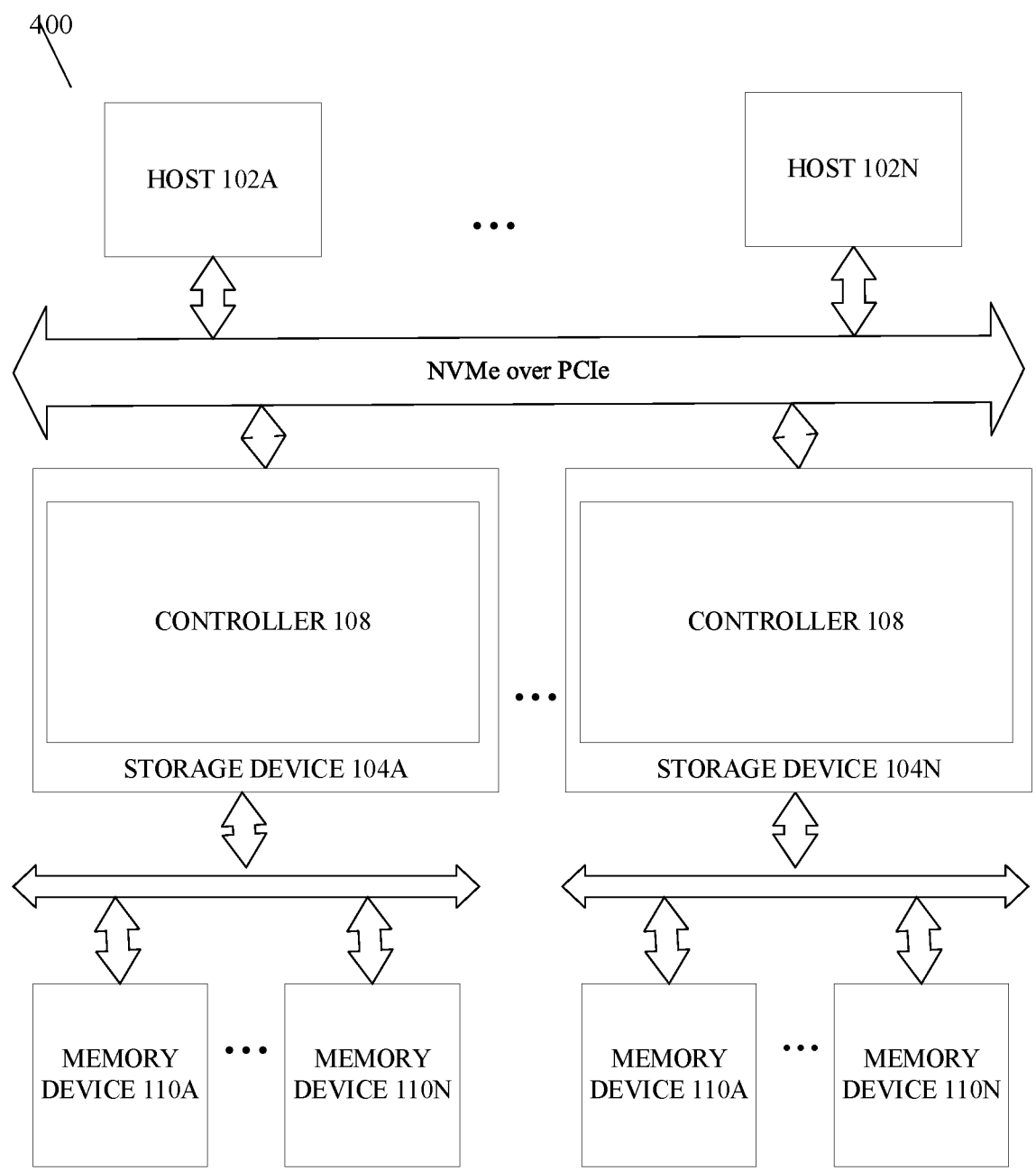
FIG. 4 is a diagram of an example environment in which systems and/or methods described herein are implemented.

FIG. 4 is a diagram of an example environment in which systems and/or methods described herein are implemented. As shown in FIG. 4, Environment 400 may include hosts 102-102n (referred to herein as host(s) 102), and storage devices 104a-104n (referred to herein as storage device(s) 104).

Storage device 104 may be a key-value storage device that includes a controller 108 to manage the resources on storage device 104. Controller 108 may improve the performance of storage device 104 by providing a mechanism to perform integrity checks on the key, the value for a defined length, and/or the key and value as a pair. Controller 108 may perform one or more integrity checks on the key and/or value prior to transmitting the value to host 102 or other requestors of the value. Hosts 102 and storage devices 104 may communicate via Non-Volatile Memory Express (NVMe) over peripheral component interconnect express (PCI Express or PCIe) standard, or the like.

Devices of environment 400 may interconnect via wired connections, wireless connections, or a combination of wired and wireless connections. For example, the network of FIG. 4 may include a cellular network (e.g., a long-term evolution (LTE) network, a code division multiple access (CDMA) network, a 3G network, a 4G network, a 5G network, another type of next-generation network, and/or the like), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 4 are provided as an example. In practice, there may be additional devices and/or networks, fewer devices and/or networks, different devices and/or networks, or differently arranged devices and/or networks than those shown in FIG. 4. Furthermore, two or more devices shown in FIG. 4 may be implemented within a single device, or a single device shown in FIG. 4 may be implemented as multiple, distributed devices. Additionally, or alternatively, a set of devices (e.g., one or more devices) of Environment 400 may perform one or more functions described as being performed by another set of devices of environment 400.

Figure 5:
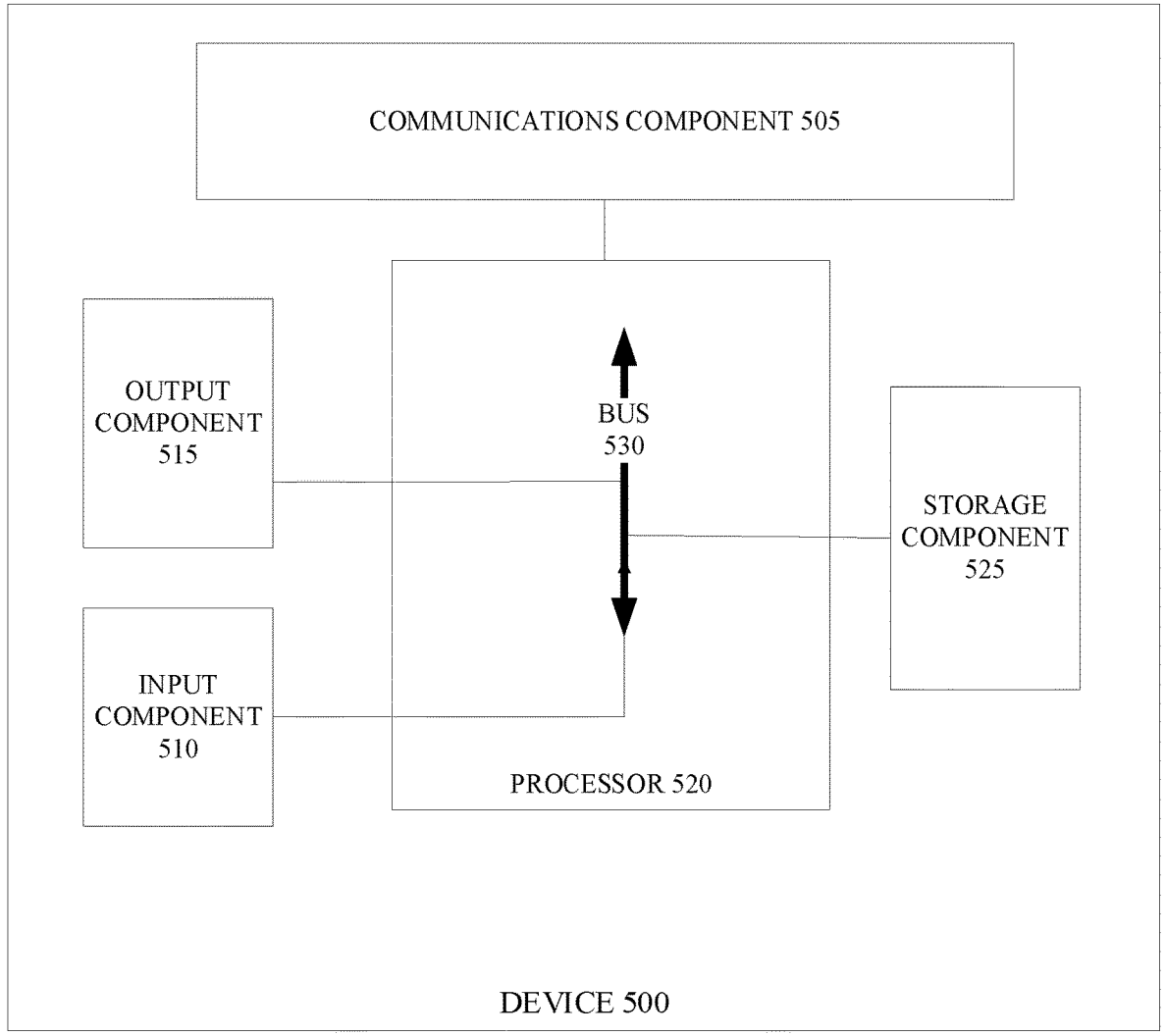
FIG. 5 is a diagram of example components of the host of FIG. 1.

FIG. 5 is a diagram of example components of one or more devices of FIG. 1. In some implementations, host 102 may include one or more devices 500 and/or one or more components of device 500. Device 500 may include, for example, a communications component 505, an input component 510, an output component 515, a processor 520, a storage component 525, and a bus 530. Bus 530 may include components that enable communication among multiple components of device 500, wherein components of device 500 may be coupled to be in communication with other components of device 500 via bus 530.

Input component 510 may include components that permit device 500 to receive information via user input (e.g., keypad, a keyboard, a mouse, a pointing device, a microphone, and/or a display screen), and/or components that permit device 500 to determine the location or other sensor information (e.g., an accelerometer, a gyroscope, an actuator, another type of positional or environmental sensor). Output component 515 may include components that provide output information from device 500 (e.g., a speaker, display screen, and/or the like). Input component 510 and output component 515 may also be coupled to be in communication with processor 520.

Processor 520 may be a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 520 may include one or more processors capable of being programmed to perform a function. Processor 520 may be implemented in hardware, firmware, and/or a combination of hardware and software.

Storage component 525 may include one or more memory devices, such as random-access memory (RAM) 114, read-only memory (ROM), and/or another type of dynamic or static storage device (e.g., a flash memory, a magnetic memory, and/or optical memory) that stores information and/or instructions for use by processor 520. A memory device may include memory space within a single physical storage device or memory space spread across multiple physical storage devices. Storage component 525 may also store information and/or software related to the operation and use of device 500. For example, storage component 525 may include a hard disk (e.g., a magnetic disk, an optical disk, and/or a magneto-optic disk), a solid-state drive (SSD), a compact disc (CD), a digital versatile disc (DVD), a floppy disk, a cartridge, a magnetic tape, and/or another type of non-transitory computer-readable medium, along with a corresponding drive.

Communications component 505 may include a transceiver-like component that enables device 500 to communicate with other devices, such as via a wired connection, a wireless connection, or a combination of wired and wireless connections. The communications component 505 may permit device 500 to receive information from another device and/or provide information to another device. For example, communications component 505 may include an Ethernet interface, an optical interface, a coaxial interface, an infrared interface, a radio frequency (RF) interface, a universal serial bus (USB) interface, a Wi-Fi interface, and/or a cellular network interface that may be configurable to communicate with network components, and other user equipment within its communication range. Communications component 505 may also include one or more broadband and/or narrowband transceivers and/or other similar types of wireless transceiver configurable to communicate via a wireless network for infrastructure communications. Communications component 505 may also include one or more local area network or personal area network transceivers, such as a Wi-Fi transceiver or a Bluetooth transceiver.

Device 500 may perform one or more processes described herein. For example, device 500 may perform these processes based on processor 520 executing software instructions stored by a non-transitory computer-readable medium, such as storage component 525. As used herein, the term "computer-readable medium" refers to a non-transitory memory device. Software instructions may be read into storage component 525 from another computer-readable medium or from another device via communications component 505. When executed, software instructions stored in storage component 525 may cause processor 520 to perform one or more processes described herein. Additionally, or alternatively, hardware circuitry may be used in place of or in combination with software instructions to perform one or more processes described herein. Thus, implementations described herein are not limited to any specific combination of hardware circuitry and software.

The number and arrangement of components shown in FIG. 5 are provided as an example. In practice, device 500 may include additional components, fewer components, different components, or differently arranged components than those shown in FIG. 5. Additionally, or alternatively, a set of components (e.g., one or more components) of device 500 may perform one or more functions described as being performed by another set of components of device 500.

The foregoing disclosure provides illustrative and descriptive implementations but is not intended to be exhaustive or to limit the implementations to the precise form disclosed herein. One of ordinary skill in the art will appreciate that various modifications and changes can be made without departing from the scope of the present disclosure as set forth in the claims below. Accordingly, the specification and figures are to be regarded in an illustrative rather than a restrictive sense, and all such modifications are intended to be included within the scope of present teachings.

As used herein, the term "component" is intended to be broadly construed as hardware, firmware, and/or a combination of hardware and software. It will be apparent that systems and/or methods described herein may be implemented in different forms of hardware, firmware, and/or a combination of hardware and software.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items and may be used interchangeably with "one or more" Furthermore, as used herein, the term "set" is intended to include one or more items (e.g., related items, unrelated items, a combination of related items, unrelated items, and/or the like), and may be used interchangeably with "one or more." The term "only one" or similar language is used where only one item is intended. Further, the phrase "based on" is intended to mean "based, at least in part, on" unless explicitly stated otherwise.

Moreover, in this document, relational terms such as first and second, top and bottom, and the like, may be used solely to distinguish one entity or action from another entity or action without necessarily requiring or implying any actual such relationship or order between such entities or actions.

The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", or "contains . . . a" does not, without more constraints, preclude the existence of additional identical elements in the process, method, article, or apparatus that comprises, has, includes, contains the element. The terms "substantially", "essentially", "approximately", "about" or any other version thereof, are defined as being close to as understood by one of ordinary skill in the art, and in one non-limiting implementation, the term is defined to be within 10%, in another implementation within 5%, in another implementation within 1% and in another implementation within 0.5%. The term "coupled" as used herein is defined as connected, although not necessarily directly and not necessarily mechanically. A device or structure that is "configured" in a certain way is configured in at least that way but may also be configured in ways that are not listed.

I claim:

1. A storage device to perform an integrity check on at least one of a key and a value in a key-value pair, prior to transmitting the value to a requestor, the storage device comprising:
a memory device to store the value; and
a processor to:
receive a write command to write the value to the memory device, generate authentication data from at least one of the key and the value in the write command prior to storing the value on the memory device, and store the authentication data and the value in the memory device; and
receive a read command to retrieve the value from the memory device, retrieve the authentication data generated by the key-value storage device prior to storing the value on the memory device, and perform the integrity check on at least one of the key and the value using the authentication data.

2. The storage device of claim 1, wherein the authentication data is a key-value header generated by the storage device, wherein the key-value header includes the key and one or more hash values generated by the storage device.

3. The storage device of claim 2, wherein the key-value header includes the key and at least one of a hash of the key plus the value for a given length and a hash of the value for a predefined length.

4. The storage device of claim 2, wherein the key-value header includes dynamic hash lengths.

5. The storage device of claim 2, wherein the key-value header includes a predetermined hash length based on a length of the value.

6. The storage device of claim 2, wherein the storage device associates each fragment of the value stored in the memory device with the key-value header and stores the key-value header and associated fragments in a same block in the memory device.

7. The storage device of claim 2, wherein the storage device associates the key assigned to each fragment of the value stored in the memory device with the key-value header.

8. The storage device of claim 2, wherein in retrieving the value, the storage device authenticates a key-to-value mapping by comparing a key obtained from the key-value header with the key in the read command.

9. The storage device of claim 2, wherein in retrieving the value, the storage device authenticates the value by regenerating a hash value stored in the key-value header with the value stored in the memory device, retrieving the hash value stored in the key-value header, comparing a regenerated hash value with the hash value stored in the key-value header, and confirming that the regenerated hash value matches the hash value stored in the key-value header.

10. A method for generating authentication data to be used in performing an integrity check on at least one of a key and a value in a key-value pair, prior to storing the value in a memory device communicatively coupled to a key-value storage device, the method comprises:
receiving, by a processor in the key-value storage device, a write command to write the value to the memory device;
generating authentication data from at least one of the key and the value in the write command prior to storing the value on the memory device, the authentication data being generated to perform an integrity check during retrieval of the value from the memory device;
storing the authentication data and the value in the memory device,
retrieving the authentication data generated by the key-value storage device prior to storing the value on the memory device; and
performing the integrity check on at least one of the key and the value using the authentication data.

11. The method of claim 10, wherein the generating comprises generating a key-value header including the key and one or more hash values.

12. The method of claim 11, wherein the generating comprises generating the key-value header including the key and at least one of a hash of the key plus the value for a given length and a hash of the value for a predefined length.

13. The method of claim 11, wherein the generating comprises generating the key-value header including dynamic hash lengths.

14. The method of claim 11, wherein the generating comprises generating the key-value header including a predetermined hash length based on a length of the value.

15. The method of claim 11, wherein the storing comprises associating each fragment of the value stored in the memory device with the key-value header and storing the key-value header and associated fragments in a same block in the memory device.

16. The method of claim 11, wherein the storing comprises associating the key assigned to each fragment of the value stored in the memory device with the key-value header.

17. A method for performing an integrity check in a key-value storage device on at least one of a key and a value in a key-value pair, prior to transmitting the value to a requestor, the method comprises:
receiving, by a processor in the key-value storage device, a read command to retrieve the value from a memory device communicatively coupled to the key-value storage device;
retrieving authentication data generated by the key-value storage device prior to storing the value on the memory device; and
performing the integrity check on at least one of the key and the value using the authentication data.

18. The method of claim 17, wherein the performing comprises authenticating a key-to-value mapping by comparing a key obtained from a key-value header generated by the key-value storage device with the key in the read command, the key-value header being part of the authentication data.

19. The method of claim 18, wherein the performing comprises:
- authenticating the value by regenerating a hash value stored in the key-value header using the value stored in the memory device,
- retrieving the hash value stored in the key-value header,
- comparing a regenerated hash value with the hash value stored in the key-value header, and
- confirming that the regenerated hash value matches the hash value stored in the key-value header.

* * * * *